United States Patent Office 2,925,424
Patented Feb. 16, 1960

2,925,424
FLUOROKETALS AND THEIR PREPARATION

Howard E. Simmons, Jr., Fairfax, Del., assignor to E. I. du Pont de Nemours and Company, Wilmington, Del., a corporation of Delaware No Drawing. Application May 3, 1956
Serial No. 582,348

8 Claims. (Cl. 260—340.7)

This invention relates to a new class of ketals and, more particularly to the cyclic ketals of selected polyfluoroperhalogenoketones and a process for their preparation.

Ketals are useful organic intermediates, solvents, and plasticizers. However known ketals generally exhibit extreme hydrolytic susceptibility with destruction of the ketal structure under acidic or neutral conditions.

This invention has as an object the preparation of new ketals. A further object is the preparation of new, stable, and hydrolytically resistant ketals. Another object is the preparation of new materials for transformer fluids. Other objects will appear hereinafter.

These objects are accomplished by the present invention of the cyclic ketals of wholly carbon chain glycols, any substituent of which is halogen and which has a chain of up to four carbons between the hydroxyls and has a total of one to twelve carbons, with wholly carbon chain polyfluoroperhalogenoketones wherein each of the carbons immediately linked to the ketone carbonyl carbon carries at least one fluorine atom, with the remaining substituents on both said carbons and on all carbons linked thereto being halogen of atomic number no greater than 53 and preferably from 9 to 35. The new cyclic ketals of this invention are alternatively described as 2,2-disubstituted-1,3-dioxacycloalkanes wherein both of the wholly carbon chain 2-substituents are directly and singly linked to the 2-carbon of the heterocyclic dioxacycloalkane ring through carbon carrying at least one fluorine substituent, with the remaining substituents on both said linking carbons and on any carbons linked directly thereto being halogen of atomic number no greater than 53 and preferably from 9 to 35. The compounds of this invention are 1,3-dioxacycloalkanes wherein the 2-carbon is completely substituted by at least one perhalogenohydrocarbon radical and has at least one fluorine on each of two carbons directly attached to it, i.e. α-carbons.

The novel cyclic ketals of the present invention have the general formula

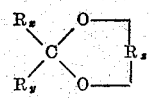

wherein $R_x$ and $R_y$, which can be alike or different, or together joined, are perhalogenosubstituted hydrocarbon radicals, generally of no more than about seven carbons each and when together joined generally forming a carbocycle of from five to seven ring carbons with the 2-carbon, in which the halogen is of atomic number no greater than 53 and preferably from 9 to 35, and in which the first or alpha-carbon of each radical, i.e., the carbon directly and singly linked to the indicated cyclic ketal or 2-carbon of the 1,3-dioxacycloalkane structure, carries at least one fluorine substituent and $R_z$ is a divalent hydrocarbon or halogenohydrocarbon radical of up to twelve carbons and of up to four chain carbons between the free valences, i.e., so as to form with the two indicated ketal oxygens and the intervening annular carbon a cyclic ketal structure of from four to seven ring members. Preferably $R_x$ and $R_y$ contain no more than six carbons each and together contain no more than seven carbons and $R_z$ contains no more than nine carbons.

The new ketals of this invention not only are notable for the surprising stability they exhibit under a variety of conditions but also for the peculiar process conditions by which they are made. The conventional ketal-forming reactions generally employ acidic conditions. These have been found to be ineffective to prepare the ketals of this invention. Surprisingly, the ketal-forming condensation between the requisite α,α'-difluoroperhalogenoketone and the cyclic ketal-forming glycol derivative must be carried out under basic conditions.

In the process aspect of the present invention a half-ester of a glycol, i.e., a compound of the formula HORX wherein X is the non-proton radical of a hydrogen acid HX and R is a divalent hydrocarbon or halohydrocarbon radical, is reacted under basic conditions with the α,α'-difluoroperhalogenoketone. The requisite ketal-forming glycol derivative corresponds in its main carbon chain, i.e., that between the hydroxyl and the ester group, to the divalent radical which together with the above-described 2-carbon and the 1- and 3-oxo oxygens forms the cyclic ketal or 2,2-disubstituted-1,3-dioxacycloalkane structure.

The following examples in which parts are by weight are illustrative of the invention.

Example I

To 50 parts of sym.-dichlorotetrafluoroacetone cooled to 0° C. was added slowly with stirring under anhydrous conditions 20.2 parts of ethylene chlorohydrin (β-chloroethyl alcohol). The reaction mixture was stirred for 15 minutes, and 35 parts of solid potassium carbonate was then added in small portions over a period of one hour. About 20 parts of n-pentane was added to facilitate mixing, and the reaction mixture was stirred for two hours at room temperature, at the end of which time 150 parts of water was added. The resultant mixture was extracted with two 50-part portions of n-pentane. The extracts were combined, washed with water, and dried over anhydrous magnesium sulfate. After removal of the n-pentane solvent and distillation of the residue, there was obtained 51.3 parts (84% theory) of 2,2-bis(chlorodifluoromethyl)-1,3-dioxolane, as a clear, colorless oil boiling at 171–172° C. at atmospheric pressure; $n_D^{25}$, 1.3896.

Analysis.—Calculated for $C_5H_4O_2Cl_2F_4$: C, 24.7%; H, 1.7%; F, 31.3%. Found: C, 24.5%; H, 1.8%.

Another sample similarly prepared and purified exhibited the following analysis. Found: C, 24.9%; H, 1.9%; F, 31.4%.

In another related preparation, ethylene chlorohydrin and sym.-dichlorotetrafluoroacetone were mixed at ice-bath temperatures, and the resultant β-chloroethyl hemiketal was added dropwise, with stirring, to a cooled (0–10° C.) concentrated aqueous solution of potassium hydroxide. The reaction mixture was further stirred at ice/water bath temperatures and finally at room temperature. Upon extraction of the organic components with n-pentane and subsequent concentration and distillation, there was obtained 2,2-bis(chlorodifluoromethyl)-1,3-dioxolane in 29.5% yield. This illustrates the improved results achieved through use of substantially anhydrous conditions.

Example II

Fifty (50) parts of sym.-tetrachlorodifluoroacetone and 17.4 parts of ethylene chlorohydrin were mixed at 9° C. under anhydrous conditions and stirred for 15 minutes. Solid potassium carbonate (29.8 parts) was then added in small portions with stirring over a period of one hour. The resultant mixture was stirred for two hours at ice/water bath temperatures and was allowed to stand overnight at room temperature. Water (100 parts) was then added, and the resultant mixture was extracted with two 50-part portions of n-pentane. The extracts were dried over anhydrous magnesium sulfate, the n-pentane was removed, and after distillation of the residue there was thus obtained 25.1 parts (42% theory) of 2,2-bis(dichlorofluoromethyl)-1,3-dioxolane as a clear, colorless liquid boiling at 100–103° C. under a pressure corresponding to 10 mm. of mercury; $n_D^{25}$, 1.4682. Refractionation afforded a pure sample boiling at 102–103° C. under a pressure corresponding to 10 mm. of mercury; $n_D^{25}$, 1.4664.

*Analysis.*—Calculated for $C_5H_4O_2Cl_4F_2$: C, 21.8%; H, 1.5%; Cl, 51.4%. Found: C, 22.2%; H, 1.7%; Cl, 51.4%.

Example III

Freshly generated perfluoroacetone (ex. 30 parts of perfluoroacetone hydrate and 60 parts of phosphorus pentoxide) was introduced as a gas at substantially room temperature beneath the surface of a mixture of 10.1 parts of ethylene chlorohydrin in about nine parts of n-pentane in a reactor equipped with a reflux condenser which was cooled with a solid carbon dioxide/acetone mixture. When refluxing of the reaction mixture stopped (about 60 minutes), ten parts of solid potassium carbonate was added in small portions over a period of about 60 minutes, and the reaction mixture was stirred for one hour and then poured into 200 parts of water. The organic layer was extracted with three 25-part portions of n-pentane, and the extracts were combined, washed with water, and finally dried over anhydrous magnesium sulfate. After removal of the solvent, there was obtained by distillation four parts (about 16% of theory) of 2,2-bis(trifluoromethyl)-1,3-dioxolane as a clear, colorless oil boiling at 99–100° C. at atmospheric pressure; $n_D^{25}$, 1.3247.

*Analysis.*—Calculated for $C_5H_4O_2F_6$: C, 28.6%; H, 1.9%; F, 54.3%. Found: C, 28.9%; H, 2.2%; F, 53.6%.

Example IV

A mixture of 50 parts of sym.-dichlorotetrafluoroacetone, 32.6 parts of 1,3-dichloro-2-propanol (α-chloromethyl-β-chloroethanol), 35 parts of solid potassium carbonate and about 15 parts of anhydrous diethyl ether was stirred for about five hours at 25–30° C. using external cooling with an ice/water bath to control the exothermic reaction. Small portions of anhydrous diethyl ether were added periodically to maintain fluidity. The reaction mixture was poured into an excess of water with stirring and the resultant mixture extracted with diethyl ether. The ether extracts were separated and dried over anhydrous magnesium sulfate. Upon concentration and distillation, there were obtained 51.3 parts (70% of theory) of substantially pure 2,2-bis(chlorodifluoromethyl)-4-chloromethyl-1,3-dioxolane as a clear, colorless oil boiling at 74.0° C. under a pressure corresponding to 6 mm. of mercury; $n_D^{25}$, 1.4186. The product contained a small amount of a carbonyl-containing impurity which was removed by treatment with methanolic potassium hydroxide. The pure 2,2-bis(chlorodifluoromethyl) - 4 - chloromethyl - 1,3 - dioxolane boiled at 100° C. under a pressure corresponding to 25 mm. of mercury; $n_D^{23}$, 1.4179.

*Analysis.*—Calculated for $C_6H_4O_2Cl_3F_4$: C, 24.7%; H, 1.7%; F, 26.1%. Found: C, 24.7%; H, 2.1%; F, 26.3%.

Under substantially identical conditions using approximately twice the proportions of the reactants and varying in that the reaction time was extended to about seven hours and the reaction mixture allowed to stand overnight before workup the 2,2-bis(chlorodifluoromethyl)-4-chloromethyl-1,3-dioxolane was obtained in about 90% of theory.

Example V

A mixture of 50 parts of sym.-dichlorotetrafluoroacetone, 31.2 parts of freshly distilled trimethylene bromohydrin (3-bromo-1-propanol), 35 parts of solid potassium carbonate, and about 200 parts of n-pentane was stirred at room temperature for 24 hours. The reaction mixture was poured with stirring into about 150 parts of water and the resultant mixture extracted with two 60-part portions of n-pentane. The combined pentane extracts were washed successively with three 100-part portions of water and one 50-part portion of saturated sodium chloride solution. After drying over anhydrous magnesium sulfate, there was obtained on concentration and distillation 28 parts (49% of theory) of crude 2,2-bis(chlorodifluoromethyl)-1,3-dioxane as a colorless oil boiling at 110–116° C. at 50 mm. pressure. Upon redistillation there was obtained 21 parts (37% of theory) of pure 2,2-bis(chlorodifluoromethyl)-1,3-dioxane as a clear, pleasant smelling oil boiling at 112–113° C. at 50 mm. pressure; $n_D^{25}$, 1.4109.

*Analysis.*—Calculated for $C_6H_6O_2Cl_2F_4$: C, 28.0%; H, 2.4%; F, 29.6%; Cl, 27.6%. Found: C, 28.1%; H, 2.6%; F, 28.5%; Cl, 27.5%.

Example VI

To a cooled (–13° C.) solution of 24.3 parts of 2,2-bis(chlorodifluoromethyl)-1,3-dioxolane in about 300 parts of carbon tetrachloride was added 7.1 parts (an equimolar proportion) of chlorine with stirring over a three-hour period under illumination from a commercial 275-watt ultraviolet lamp. The chlorine was added at such a rate as to maintain a faint yellow color in the reaction mixture. At the end of the chlorine addition, the solvent was removed by distillation under reduced pressure and there was thus obtained as a residue 25.2 parts (91% of theory) of the crude monochloro derivative. Upon precision fractionation there was obtained 18.0 parts (65% of theory) of pure 2,2-bis(chlorodifluoromethyl)-4-chloro-1,3-dioxolane as a clear, colorless liquid boiling at 179–181° C. at atmospheric pressure; $n_D^{25}$ 1.4093.

*Analysis.*—Calculated for $C_5H_3Cl_3F_4O_2$: Cl, 38.2%; M.W., 275. Found: Cl, 39.4%; M.W., 290, 293.

Another chlorination carried out in identical fashion varying only in that a reaction temperature of 5° C. was used afforded approximately similar results except that the monochloro compound was contaminated by appreciable quantities of the dichloro compound. After two precision fractionations, the pure 2,2-bis(chlorodifluoromethyl)-4-chloro-1,3-dioxolane was obtained as a clear, colorless liquid boiling at 179–180° C. at atmospheric pressure; $n_D^{25}$ 1.4050.

*Analysis.*—Calculated for $C_5H_3Cl_3F_4O_2$: C, 21.6%; H, 1.1%; Cl, 38.3%; F, 27.4%; M.W., 275. Found: C, 21.9%; H, 1.4%; Cl, 37.6%; F, 27.5%; M.W, 258, 268.

Example VII

As described in Example VI, 7.1 parts (an equimolar proportion) of chlorine was added to a solution of 24.3 parts of 2,2-bis(chlorodifluoromethyl)-1,3-dioxolane in about 300 parts of carbon tetrachloride over a period of three hours. The chlorine addition was continued for an additional 20 minutes, during which time it was found possible to add another 7.1 parts (a second molar proportion) of chlorine. The solvent was removed by distillation under reduced pressure and there was thus obtained 31.6 parts (96% of theory) of the crude dichloro compounds. By precision fractionation, there was obtained 26.5 parts (85% of theory) of a mixture of 2,2 - bis(chlorodifluoromethyl) - 4,4 - dichloro - 1,3-dioxolane and 2,2 - bis(chlorodifluoromethyl) - 4,5 - dichloro-1,3-dioxolane as a clear, colorless liquid boiling at 182–184° C. at atmospheric pressure; $n_D^{25}$ 1.4159. Nuclear magnetic resonance spectra and infrared absorption data indicated the product to be the indicated isomers and showed the presence of a —CH$_2$— group.

*Analysis.*—Calculated for $C_5H_2Cl_4F_4O_2$: C, 19.3%; H, 0.7%; Cl, 45.5%; F, 24.4%; M.W., 312. Found: C, 20.4%; H, 0.9%; Cl, 45.0%; F, 24.9%; M.W., 319, 332.

*Example VIII*

As in Example VI, 21.3 parts (3 molar proportions) of chlorine was added with stirring to a solution of 24.3 parts of 2,2-bis(chlorodifluoromethyl)-1,3-dioxolane in about 300 parts of carbon tetrachloride over a period of two hours while maintaining the reaction mixture at 40° C. The solvent was removed by distillation under reduced pressure and there was thus obtained as a residue 32.6 parts (95% of theory) of the crude trichloro compound. Upon precision fractionation, there was obtained 20.2 parts (58% of theory) of pure 2,2-bis(chlorodifluoromethyl) - 4,4,5 - trichloro - 1,3 - dioxolane as a clear, colorless liquid boiling at 199–200° C. at atmospheric pressure, $n_D^{25}$ 1.4319.

*Analysis.*—Calculated for $C_5HF_4Cl_5O_2$: C, 17.3%; H, 0.3%; F, 21.9%; Cl, 51.2%; M.W., 346. Found: C, 16.8%; H, 0.45; F, 21.0%; Cl, 52.2%; M.W., 358, 359.

*Example IX*

Example VIII was repeated varying only in that 31.2 parts (4.4 molar proportions) of chlorine was added over a period of 2.5 hours while maintaining the reaction mixture at 50° C. The solvent was remover by distillation under reduced pressure and there was obtained as a residue 37.9 parts (99% of theory) of the crude tetrachloro compound. Upon precision fractionation, there was obtained 25.7 parts (68% of theory) of pure 2,2-bis(chlorodifluoromethyl) - 4,4,5,5 - tetrachloro - 1,3 - dioxolane as a clear, colorless liquid boiling at 218–219° C.; $n_D^{25}$ 1.4466.

*Analysis.*—Calculated for $C_5F_4Cl_6O_2$: C, 15.8%; H, 0.0%; F, 20.0%; Cl, 55.0%; M.W., 381. Found: C, 16.2%; H, 0.4%; F, 20.1%; Cl, 55.9%; M.W., 364, 370.

The present invention is generic to cyclic ketals of glycols, having a wholly carbon chain between the hydroxyls, in which the hydroxyls are joined by means of a bivalent organic radical in which any substituent is halogen of atomic number no greater than 53 and preferably no greater than 35 with wholly carbon chain perhalogenoketones, especially those aliphatic in character, i.e., aliphatic, cycloaliphatic, or mixed aliphatic cycloaliphatic ketones, which perhalogenoketones carry at least one fluorine atom on each of the alpha carbons, i.e., the two carbons immediately linked to the ketone carbonyl. Any such α,α'-difluoroperhalogenoketone may be employed including, in addition to those given in the examples, polyfluoroperhalogeno aliphatic ketones, e.g., perfluoroethyl perfluoropropyl ketone, i.e., perfluorohexan-3-one, bis(perfluoropropyl)ketone, perfluoromethyl perfluoropropyl ketone, etc.; polyfluoroperhalogenoaliphatic/cycloaliphatic ketones, e.g., perfluorocyclohexyl perfluoromethyl ketone, etc.; polyfluoroperhalocycloaliphatic ketones, e.g., perfluorocyclopentanone, etc.

The present invention is also generic to the preparation of these cyclic ketals by the reaction of these α,α'-difluoroperhalogenoketones with the half-esters, with mono- and polybasic, organic and inorganic acids, of glycols wherein the hydroxyls are connected by a bivalent hydrocarbon radical, any substituent on which is a halogen of atomic number not greater than 53 and preferably not greater than 35. Because of their greater reactivity in the ketal-forming reaction the half-esters of the glycols with the hydrohalic acids and the half-esters of the glycols with oxygen-containing acids, especially the strong oxygen-containing acids of the elements of group VI-A of the periodic table, especially those of sulfur, are preferred.

These ketal-forming glycol derivatives can be described by the following structural formula:

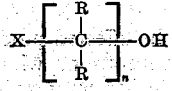

wherein the R's, which can be alike or different, are used to represent hydrogen, hydrocarbon (including aliphatic, aromatic, cycloaliphatic, araliphatic, alkaromatic), halogen of atomic number no greater than 53, and preferably from 9 to 35, or halogenohydrocarbon where the halogen is as above; n is used to represent a small, preferably plural, integer no greater generally than four and preferably two or three; and X is halogen of atomic number no greater than 53, and preferably from 9 to 35, or the neutral monovalent cation of a strong oxygen-containing acid, most preferably of sulfur, linked to the indicated carbon chain diradical through ester oxygen. The carbon chain diradical involved in these ketal-forming glycol derivatives, i.e.,

corresponds to $R_z$ of the formula, above given, of the cyclic ketals of this invention and, with the two oxo atoms and the necessary 2-carbon therebetween forms the annulus of the 1,3-dioxa-2,2-(α,α'-difluoroperhalogenosubstituted)cycloalkanes of the present invention. Thus, the total number of ring members in these new compounds is three greater than n (the number of chain carbons between hydroxyl and ester groups), i.e. (n+3), which sum is generally of from five to seven carbons. Because of readier availability of the necessary intermediates the most preferred compounds are those where n is 2 or 3, i.e., the dioxolanes and dioxanes, especially the former.

Any such glycol half-ester may be employed including not only those shown in the examples above but also: halohydride half-esters of alkylene glycols, e.g., 2-chloro-1-propanol, tetramethylenechlorohydrin, etc.; halohydride half-esters of aromatic-substituted alkylene glycols, e.g., β-phenyl-β-chloroethyl alcohol, etc.; halohydride half-esters of cycloaliphatic-substituted alkylene glycols, e.g., 1-hydroxymethylcyclohexyl chloride, etc.; halohydride half-esters of araliphatic-substituted alkylene glycols, e.g., β-benzyl-β-chloroethyl alcohol, etc.; halohydride half-esters of alkaromatic-substituted alkylene glycols, e.g., β-p-tolyl-β-chloroethyl alcohol, etc.; halohydride half-esters of halogen-substituted alkylene glycols, e.g., 2-bromo-1-bromomethylethyl alcohol, etc.; halohydride half-esters of cycloaliphatic glycols and substituted glycols, e.g., 2-chlorocyclohexanol, etc.; half-esters of the above glycols and substituted glycols with the strong oxygen-containing acids, e.g., 2-hydroxyethyl methylsulfate, 2-hydroxyethyl p-toluene-sulfonate, etc.

The new ketals of this invention are prepared by direct condensation of the aforesaid polyfluoroperhalogenoketones and the glycol half-ester in the presence of a base, preferably an inorganic salt of a strong base and a weak acid. These three reactants can be used in substantially equimolar proportions. However, excesses of the latter two are generally used to facilitate reaction. The ketal-forming glycol derivative is generally not used in over 50% excess but the basic reacting salt can be present in amounts up to 100% excess or greater. The anion, i.e., acid moiety, of the salts can be organic or inorganic, the only important criterion being that it be one of a weak acid, preferably weaker than the hemiketal of the polyfluoroperhalogenoketone, i.e., of pK$_a$ greater than 4. Suitable specific examples include the carbonates, bicarbonates, hydroxides, cyanides, acetates, benzoates, etc. Because of readier availability and greater reaction efficiency, the alkali metal and alkaline earth metal salts are preferred. The most common of these are the lithium, sodium, potassium, magnesium, calcium, and barium carbonates, bicarbonates, hydroxides, and acetates.

The reaction can be effected properly in the presence or absence of an aqueous or wholly organic reaction medium. For reasons of increased yields, the reaction zone is preferably maintained under anhydrous conditions. Because of the necessarily present inorganic basic salt or salt-forming derivative and the salt formed during the reaction an inert organic diluent is generally employed or is added as the reaction proceeds in order to facilitate mixing of the various materials. Any inert liquid organic diluent can be used, and generally speaking the most common are employed, e.g., the normally liquid hydrocarbons and halogenated hydrocarbons, including the aliphatic and halogenated aliphatic compounds, such as: the hexanes, the heptanes, the octanes, the various chlorinated aliphatic hydrocarbons, including carbon tetrachloride, tetrachloroethylene, the chloropentanes, and the like; the aromatic and halogenated aromatic hydrocarbons such as benzene, toluene, the xylenes, chlorobenzene, and the like; the cycloaliphatic and halogenated cycloaliphatic hydrocarbons, e.g., cyclohexane, chlorocyclohexane, and the like. The choice of the particular inert diluent is not at all critical, and will vary primarily with the reaction temperature found necessary.

The condensation is carried out at temperatures ranging from below 0° to generally no higher than 200° C., varying with the relative reactivity of the particular polyfluoroperhalogenoketone and the particular ketal-forming glycol derivative thereof being used. Thus, with the short-chain ketones and the short-chain ketal-forming glycol derivatives of no more than a total of about six to eight carbons each, the reaction can be carried out at temperatures from generally no lower than about 25° C. to about 50° C. Practically speaking, the reaction can be effected in most instances over the range 0–100° C.

The pressure at which the reaction is carried out is largely immaterial and will vary, as will be apparent to those skilled in the art, with the specific nature of the reactants and the operating temperature being used, i.e., temperature and pressure are interdependent variables apparent for each particular system. Thus, if a lower boiling reactant is used and a higher reaction temperature is desired, efficient condensing means must be supplied to insure retention of that reactant in the reaction zone, or, alternatively, the reaction must be carried out in a closed reactor under superatmospheric pressure.

After the initial condensation is effected, the precipitated inorganic salts can be removed from the reaction mixture by simple filtration, and the product can be isolated and purified by conventional procedures. A simple method of carrying out these same steps, particularly in those instances where a liquid organic diluent is used and the precipitated inorganic salts are water-soluble, is to treat the entire reaction mixture with an excess of water, whereby the salts dissolve in the aqueous layer and the organic material including the product remains in the organic layer. Simple separation of the latter, followed by distillation and/or crystallization generally affords the desired ketals directly in high purity.

By employing the above described methods there may be prepared further cyclic ketals of the present invention. Thus, 2,2-bis(chlorodifluoromethyl) - 4 - methyl-1,3-dioxolane is obtained from 2-chloro-1-propanol and sym.-dichlorotetrafluoroacetone; 2,2 - bis(dichlorofluoromethyl)-1,3-dioxepane is obtained from tetramethylene chlorohydrin and sym.-tetrachlorodifluoroacetone; 2,2-bis-(trifluoromethyl)-4-phenyl-1,3-dioxolane is obtained from β-phenyl-β-chloroethyl alcohol and hexafluoroacetone; 2,2-bis(chlorodifluoromethyl) - 4,4 - pentamethylene-1,3-dioxolane (also identified as 2,2-bis(chlorodifluoromethyl)-1,3-dioxaspiro[4.5]decane) is obtained from 1-hydroxymethylcyclohexyl chloride and sym.-dichlorotetrafluoroacetone; 2,2-bis(chlorodifluoromethyl) - 4 - benzyl-1,3-dioxolane is obtained from β-benzyl-β-chloroethyl alcohol and sym.-dichlorotetrafluoroacetone; 2-perfluoroethyl-2-perfluoropropyl-4-p-tolyl-1,3-dioxolane is obtained from β-p-tolyl-β-chloroethyl alcohol and perfluoroethyl perfluoropropyl ketone; 2,2-bis(perfluoropropyl)-4-bromomethyl-1,3-dioxolane is obtained from 2-bromo-1-bromomethylethyl alcohol and bis(perfluoropropyl) ketone; 2-perfluoromethyl-2-perfluoropropyl-4,5-hexahydrobenzo-1,3-dioxolane (also identified as 3-perfluoromethyl-3-perfluoropropyl-2,4-dioxabicyclo[3.4.0]nonane) is obtained from 2-chlorocyclohexanol and perfluoromethyl perfluoropropyl ketone; 2-perfluorocyclohexyl-2-perfluoromethyl-1,3-dioxolane is obtained from 2-hydroxyethyl methylsulfate and perfluorocyclohexyl perfluoromethyl ketone; and 2,2-octafluorotetramethylene-1,3-dioxolane (also identified as 5,5,6,6,7,7,8,8-octafluoro-1,4-dioxaspiro[4.4]nonane) is obtained from 2-hydroxyethyl-p-toluenesulfonate and perfluorocyclopentanone.

The new cyclic ketals of this invention, i.e., ketals of wholly carbon chain glycols with polyfluoroperhalogenoketones wherein both the carbons immediately linked to the carbonyl carbon carry at least one fluorine substituent, are markedly different from previously known ketals, even including those of perhalogenoketones not containing the two necessary alpha-fluorine substituents. The differences are fundamental, extending even to the possible modes of preparation of the ketals. Thus, the conventional routes to cyclic ketals, e.g., the direct interaction of a glycol with a ketone or the interaction of an orthoester and a ketone using strong acid catalysts such as hydrogen chloride, p-toluenesulfonic acid and the like—see methods 129 and 130, pages 261–264, Wagner and Zook, "Synthetic Organic Chemistry," Wiley, 1953—do not result in the formation of the desired ketals.

Conversely, when the ketalization method found necessary for the ketals of the present invention, i.e., ketalization under basic conditions is applied to somewhat similar haloketones, including the perhaloketones, wherein the carbons immediately linked to the carbonyl carbon do not have bonded thereto the necessary fluorine substituent, no ketals are obtained. Thus, when hexachloroacetone and ethylene chlorohydrin were mixed at 0° C., treated with solid potassium carbonate, stirred and extracted, all in the detailed manner illustrated in the foregoing examples, no 2,2-bis(trichloromethyl)-1,3-dioxolane, i.e., the cyclic ketal, was obtained. The only product which could be isolated was the β-chloroethylester of trichloroacetic acid as a clear, colorless liquid, boiling at 57° C. under a pressure corresponding to 0.2 mm. of mercury; $n_D^{25}$, 1.4782.

*Analysis.*—Calculated for $C_4H_4O_2Cl_4$: C, 21.30%; H, 1.80%; Cl, 62.8%. Found: C, 22.10%; H, 2.00%; Cl, 62.7%.

Thus, when the ketone does not have necessary fluorosubstituent on each α-carbon, the necessary basic synthesis fails, and only products arising from haloform cleavage result.

The new cyclic ketals of this invention range from clear, colorless, pleasant-smelling liquids to low-melting solids, depending generally on the total number of carbons in the molecule. Generally speaking, those containing less than about 18 carbons are clear, colorless, pleasant-smelling liquids boiling normally from 100–300° C.

Most surprising properties of the new ketals of the present invention are their extreme chemical and physical stability, and especially their extreme hydrolytic stability. In general ketals are extremely sensitive to aqueous acid with ready hydrolysis to the starting aldehyde and alcohol. Thus, in the preparation of ketals according to Wagner and Zook, supra, the various acidic catalysts must be very carefully neutralized or otherwise removed before the necessary continuing aqueous workup, otherwise the ketals would not be obtained. In surprising contrast, the present ketals show substantially no reaction with aqueous acids even at elevated temperatures. More specifically, the cyclic ketal of Example I [2,2-bis(chlorodifluoromethyl)-1,3-dioxolane], a typical representative of this new class of ketals, was heated at the reflux for eighteen hours in methanol containing 67 volume percent of aqueous concentrated hydrochloric acid, and 98% of the ketal was recovered. The recovered material, even after precision fractionation, amounted to about 92% of ketal charged and exhibited an $n_D^{25}$, 1.3899 as compared with 1.3896 for the starting material.

Another sample of 2,2-bis(chlorodifluoromethyl)-1,3-dioxolane, similarly prepared and exhibiting a refractive index $n_D^{25}$, 1.3908, was treated under the following conditions with no observable change and with the indicated refractive indices respectively obtained on the treated sample after recovery:

(a) 9 M sulfuric acid at 160° C. for 96 hours; $n_D^{25}$, 1.3906
(b) 8 M nitric acid at 160° C. for 96 hours; $n_D^{25}$, 1.3908
(c) Concentrated hydrochloric acid at 120° C. for 96 hours; $n_D^{25}$, 1.3908
(d) 20% aqueous potassium hydroxide at 80° C. for 24 hours; $n_D^{25}$, 1.3904

These new ketals are not only stable to acids but show no reaction with various metals, either in solvents or to the metal alone, including exposure at elevated temperatures. More specifically, a representative ketal [2,2-bis(chlorodifluoromethyl)-1,3-dioxolane] failed to undergo any reaction with metallic zinc in isoamyl alcohol or with metallic magnesium in diethyl ether or in di-n-butyl ether. Similarly, upon heating the same ketal in the presence of zinc dust, magnesium powder, or copper powder, no evidence of reaction was obtained.

The extreme stability of these new polyfluoro-containing ketals is based on the fact that each of the carbons immediately linked to the 2-carbon of the ring, i.e., the carbon between the two ketal oxygens, carries at least one fluorine substituent. The stability of these ketals is not a function of fluorine content alone but is a function of fluorine content and position of the fluorine substituents. Thus, 2-trifluoromethyl-1,3-dioxolane, i.e., the the cyclic acetal of trifluoroacetaldehyde, which does not fulfill the above requirement, was obtained readily as a clear, colorless liquid, boiling at 91.5–92° C. at atmospheric pressure and exhibiting a $n_D^{25}$, 1.3365, by the condensation of trifluoroacetaldehyde hydrate with ethylene chlorohydrin in the presence of magnesium sulfate, followed by treatment with anhydrous solid potassium carbonate. This compound has only one fluorine-substituted carbon bonded directly to the carbon carrying the ketal oxygens. In contrast to the behavior exhibited by the ketals of the present invention, hydrolysis of this acetal with methanolic hydrogen chloride resulted in complete destruction of the compound.

The new ketals of this invention exhibit not only surprisingly high hydrolytic stability but also outstanding resistance against thermal and oxidative degradation, and are in fact non-flammable. Furthermore, they possess sufficiently high boiling points so as to make them of utility in certain so-called "stable liquid" outlets, e.g., as transformer fluids, as fluids for high temperature power transmission or hydraulic systems, or for use in liquid coupled mechanical drives, and the like, where a particularly high degree of oxidative and hydrolytic stability is needed at elevated temperatures.

Thus, the 2,2-bis(chlorodifluoromethyl)-1,3-dioxolane of Example I, a representative member of the class of cyclic ketals of this invention, was heated at the reflux (172° C.) at atmospheric pressure for 125 hours with a stream of air being bubbled through the boiling liquid. At the end of this time a very faint light-yellow coloration was noted as the only change in the liquid ketal. There was recovered 86.5% of the starting ketal, the losses being due to a relatively inefficient condenser and entrainment by air. The initial sample of the ketal exhibited a refractive index at 25° C. of 1.3895 and an $n_{inh.}$ of 0.008 as determined in a 1.8% solution in benzene. The material remaining at the end of the 125 hours exhibited values of 1.3899 and 0.009, respectively, as determined in identical fashion.

The term "substituent" is used herein in its ordinary sense to indicate a replacement for hydrogen on carbon.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. 2,2-bis(chlorodifluoromethyl)-1,3-dioxolane.
2. 2,2-bis(dichlorofluoromethyl)-1,3-dioxolane.
3. 2,2-bis(trifluoromethyl)-1,3-dioxolane.
4. 2,2 - bis(chlorodifluoromethyl)-4-chloromethyl-1,3-dioxolane.
5. 2,2-bis(chlorodifluoromethyl)-1,3-dioxane.
6. The process for preparing cyclic ketals which comprises reacting together a base, a perhalogenoketone having fluorine on each carbon linked directly to the ketone carbonyl, and a half ester of a glycol selected from the class consisting of hydrocarbon and halohydrocarbon glycols with up to 4 carbons between the hydroxyl groups and a total of up to 12 carbons and an acid of the class consisting of hydrohalic acids and strong oxygen-containing acids of an element of group VI–A of the periodic table.
7. The process of claim 6 wherein the half ester is of ethylene glycol and the ketone is a perhalogeno acetone.
8. A compound of the group consisting of 1,3-dioxolanes, 1,3-dioxanes and 1,3-dioxepanes wherein (1) the 2-carbon carries a member of the group consisting of two monovalent perhalogenated hydrocarbon radicals of no more than 7 carbons each and one divalent perhalogenated hydrocarbon radical forming with the 2-carbon a carbocycle of 5 to 7 ring carbons, (2) each carbon directly attached to the 2-carbon carries at least one fluorine, (3) each heterocyclic ring carbon other than the 2-carbon carries two members of the group consisting of hydrogen, halogen, lower alkyl and lower haloalkyl, and (4) all halogen in the compound is of atomic number no greater than 53.

References Cited in the file of this patent
UNITED STATES PATENTS

| | | |
|---|---|---|
| 2,260,261 | Morey | Oct. 21, 1941 |
| 2,433,844 | Hanford | Jan. 6, 1948 |
| 2,522,566 | Chaney | Sept. 19, 1950 |
| 2,595,304 | Schroder | May 6, 1952 |
| 2,609,304 | Jones et al. | Sept. 2, 1952 |

FOREIGN PATENTS

| | | |
|---|---|---|
| 583,874 | Great Britain | Jan. 1, 1947 |

OTHER REFERENCES

Hibbert et al.: J. Am. Chem. Soc., vol. 45, pp. 734–751, March 1923.
Hill et al.: J.A.C.S., vol. 45, pp. 3108–32 (1923).
Kuhn: J. Prakt. Chem., vol. 156, pp. 103–49 (1940). (See C.A., vol. 35: 1763$^5$.)